(12) United States Patent
Anderson

(10) Patent No.: US 8,151,975 B1
(45) Date of Patent: Apr. 10, 2012

(54) RAIL CONVEYOR SYSTEM

(76) Inventor: Donald Anderson, Neillsville, WI (US)

( * ) Notice: Subject to any disclaimer, the term of this patent is extended or adjusted under 35 U.S.C. 154(b) by 0 days.

(21) Appl. No.: 13/066,281

(22) Filed: Apr. 11, 2011

Related U.S. Application Data

(60) Provisional application No. 61/342,662, filed on Apr. 19, 2010.

(51) Int. Cl.
B65G 25/04 (2006.01)

(52) U.S. Cl. ................ 198/750.2; 198/750.1; 414/525.9

(58) Field of Classification Search ............... 198/750.1, 198/750.2, 750.14, 750.8; 414/525.1, 525.9
See application file for complete search history.

(56) References Cited

U.S. PATENT DOCUMENTS

| 2,629,504 | A | | 2/1953 | Peterson | |
|---|---|---|---|---|---|
| 2,973,856 | A | | 3/1961 | Brooks | |
| 3,225,905 | A | | 12/1965 | La Belle | |
| 3,534,875 | A | | 10/1970 | Hallstrom, Jr. | |
| 4,143,760 | A | | 3/1979 | Hallstrom | |
| 4,508,211 | A | | 4/1985 | Foster | |
| 4,962,848 | A | * | 10/1990 | Foster | 198/750.2 |
| 5,482,155 | A | * | 1/1996 | Foster | 198/750.2 |
| 5,560,472 | A | | 10/1996 | Gist | |
| 5,806,660 | A | | 9/1998 | Foster | |
| 5,839,568 | A | * | 11/1998 | Clark | 414/525.9 |
| 6,003,660 | A | * | 12/1999 | Foster | 414/525.1 |
| 6,257,396 | B1 | | 7/2001 | Quaeck | |
| 6,513,648 | B1 | | 2/2003 | Hallstrom et al. | |
| 6,786,324 | B2 | * | 9/2004 | De Raad | 198/750.4 |
| 7,152,729 | B2 | | 12/2006 | Wilken et al. | |
| 7,604,109 | B2 | | 10/2009 | Foster et al. | |

* cited by examiner

Primary Examiner — James R Bidwell
(74) Attorney, Agent, or Firm — Tipton L. Randall

(57) ABSTRACT

A rail conveyor system comprises a base member supporting a rail conveyor mechanism that includes a mechanical power transfer assembly mounted within the base member. A plurality of parallel support rods mounted upon the base member is rotatable by the mechanical power transfer assembly. A plurality of parallel square tubes rests perpendicularly to and upon the support rods providing a uniform support surface above the base member. The tubes are operatively connected to the power transfer assembly for sequential, longitudinal reciprocation, perpendicular to the support rods. The support rods each include a series of indented surfaces for sequentially lowering one of the tubes relative to three adjacent tubes. The mechanical power transfer assembly provides sequential, longitudinal movement of three adjacent tubes in one direction and movement of a fourth bracketed tube in an opposite direction, while simultaneously rotating the support rods to first lower, then raise the opposite moving fourth bracketed tube.

12 Claims, 11 Drawing Sheets

RAIL CONVEYOR SYSTEM

CROSS-REFERENCE TO RELATED APPLICATIONS, IF ANY

This application claims the benefit under 35 U.S.C. §119 (e) of provisional application Ser. No. 61/342,662, filed 19 Apr. 2010. Application Ser. No. 61/342,662 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to conveyors and, more particularly, to a conveyor or walking floor system for use in transferring items resting upon the conveyor or walking floor system and, most particularly, to a conveyor or walking floor system installed on the floor of a cargo transport vehicle or container, the conveyor or walking floor system providing automated transfer of items into and out of the cargo transport vehicle or container.

2. Background Information

Conveyor or walking floor systems are well-known devices used in the trucking industry for automated movement of containers and the like into and out of a cargo transport vehicle, such as a semi-trailer. Many patents have been granted that concern rail conveyor-walking floor systems for moving containers or bulk solids in a selected direction. Examples of such patent are detailed below.

Peterson, in U.S. Pat. No. 2,629,504, describes an improved unloading mechanism for a vehicle, having a reciprocating bottom for discharging a load. The reciprocating bottom consists of a plurality of longitudinally extending bottom portions constructed to reciprocate and transverse contiguously positioned longitudinal portions, which are movable successively in a longitudinal direction, with the portions being movable in concert in an opposite direction for unloading a vehicle. The load carrying bottom includes of a plurality of first and second floor portions positioned in transverse contiguous relation. The first and second portions are alternately positioned, and alternate portions are movable successively in a forward direction, independently of a load carried on the bottom. All the portions are movable rearwardly as a unitary structure for moving a load to the rear of the vehicle and for discharging the load.

In U.S. Pat. No. 2,973,856, Brooks discloses a conveyor for use in trucks and trailers, loading platforms and the like, which is capable of transporting heavy loads. The conveyor requires a minimum sacrifice of headroom when used in a truck body or the like, on the order of 2". The conveyor members extend the entire length (or width) of the truck bed or the like, to engage the entire load simultaneously and evenly, and the members move through a short cyclical path in effecting step-by-step advancement of the load in either direction. The invention provides a novel conveyor control system having a pair of alternatively operable conveyor elements moving between limit positions, where the arrival at a limit position is employed for rapid and automatic recycling. The conveyor members and base include opposed triangular ramps with rollers there between to effect raising and lowering of the conveyor members. Alternatively, rocking cams (202), which raise and lower the conveyor elements, are provided.

La Belle in U.S. Pat. No. 3,225,905, describes a reciprocating conveyor in which a series of spaced elongated stationary members, permanently mounted on the base, are reduced in cross section on the forward end to provide a vertical shoulder having a socket. An upright plate on the end of each stationary member has a hole, longitudinally aligned with the socket in the vertical shoulder. A longitudinally disposed roller, provided with end pintles, is mounted for rotation on the forward portion of each elongated stationary member. The end pintles on the rollers are supported in the sockets and the holes in the upright plates so that the upper periphery thereon coincides with the plane of the top surface on the elongated stationary members. A coupling strap, having a pair of spaced openings, is connected adjacent the end of each outer elongated stationary member by means of a bolt.

A pair of transverse shafts is rotatably supported in the bearings mounted in the elongated stationary members. Elongated movable members, disposed between the spaced elongated stationary members, are reduced in cross section on each end. A tubular bearing is mounted adjacent the rear end of each elongated movable member, and a downwardly disposed flat bearing is provided on the forward end of each member. Spaced cams, disposed in the tubular bearings, are mounted on each of the transverse shafts, intermediate the stationary members, and removably secured thereon by means of keys. The cams on the transverse shaft are in sliding engagement with the downwardly disposed flat bearings on the elongated movable members. A reversible electric motor is detachably connected to one of the transverse shafts by means of a coupling. A sprocket is mounted on each of the transverse shafts and connected together by means of an endless link chain.

In operation, the electric motor, when energized, drives the transverse shaft, which transmits the driving effort through the link chain to the other transverse shaft. As the transverse shafts are rotated, they drive their respective cams in a clockwise or counterclockwise direction depending upon the direction in which the electric motor is rotating. A clockwise rotation of the cams elevates the elongated movable members above the upper surface of the stationary members to the broken line position, shown in FIG. 2. Simultaneously, rotation of the cams on the transverse shafts also shifts the elongated movable members in a forward direction relative to the stationary members. Any load on the conveyor is thus moved toward the rollers on the elongated stationary members, a fixed distance upon every complete revolution of the cams. When the load has thus been shifted so that it is being supported entirely on the rollers, it can be readily removed from the conveyor by application of a transverse force of sufficient magnitude. A load can likewise be conveniently placed on the conveyor by means of the rollers. A counterclockwise rotation of the cams moves the load toward the rear of the conveyor in the manner previously described.

In U.S. Pat. No. 3,534,875, Hallstrom, Jr. discloses a reciprocating conveyor that includes a plurality of groups of at least three elongated slats, arranged side by side to form a conveyor type truck bed. The slats of each group are connected to a drive mechanism in such manner that there are always a greater number of slats of each group moving simultaneously in the conveying direction, while the remaining slat or slats of the group move in the opposite direction. The drive mechanism includes rotary, eccentric, drive cams and drive rods to power the conveyor. Power is provided to the rotary, eccentric, drive cams through a universal joint connected to the drive shaft of the conveyance.

Hallstrom, in U.S. Pat. No. 4,143,760, describes a conveyor, having at least one group of at least three elongated slats mounted side-by-side on a frame for longitudinal reciprocation to form the conveyor. The slats are connected to a fluid pressure drive mechanism, which is operable to move all of the slats of each group from a start position, simultaneously, in a load-conveying direction and then to move the slats of each group, sequentially, in the opposite direction from the advanced position back to the start position. The slats of each group are interengaged releasably in the conveying direction to insure simultaneous movement.

In U.S. Pat. No. 4,508,211, Foster discloses generally horizontally disposed, bracing trusses, interconnected between the bottoms of the longitudinal drive beams and the bottoms of the associated transverse drive beams, within a reciprocating floor conveyor. Trucks equipped with reciprocating floor conveyors are backed into a receiving house, and the conveyors are used for unloading bulk material from the trucks into the receiving house. The bulk material is conveyed from the receiving house up to an elevated inlet at one end of an elongated enclosure. The enclosure includes a reciprocating floor conveyor at its bottom and an elevated screw conveyor at its top. The reciprocating conveyor is operated to move bulk material out from the enclosure at a controlled rate. The elevated screw conveyor is used for rapidly distributing additional bulk material that is being added at the elevated inlet and the trailing portion of a previous deposit of the bulk material, which has been moved away from the elevated inlet by the reciprocating floor conveyor.

Gist, in U.S. Pat. No. 5,560,472, describes a walking floor having a plurality of floor beams to support a load, and being longitudinally reciprocal to move the load longitudinally to an unloaded condition. The floor beams are supported by a transverse subfloor, having guides to control movement of the floor beams, and bearing/seal devices mounted to the subfloor and in bearing and sealing contact with the floor beams to prevent material that is part of the load supported by the floor beams from migrating below the floor beams.

In U.S. Pat. No. 5,806,660, Foster discloses alternate conveyor slats, having laterally outwardly projecting, upper side portions, each with a depending, longitudinal, load transmitting bead. The beads sit down on and slide longitudinally along bearing/seal surfaces that are a part of upper side portions of the intermediate conveyor slats. The alternate conveyor slats are guided by longitudinal guide beams. Hold down members, secured to the guide beams, serve to resist unwanted upward movement of the conveyor slats. The intermediate conveyor slats are snap-fitted onto bearings, which, in turn, are snap-fitted onto longitudinal guide and support beams. The weight of conveyor slats, and the weight of any load on the conveyor slats, is transmitted by the contact of the bead with the bearing/seal surfaces to the conveyor slats. This weight, the weight of the conveyor slats and the weight of any load on conveyor slats, is transmitted to the bearings and from the bearings to the guide and support beams.

Quaeck, in U.S. Pat. No. 6,257,396, describes a load supporting and moving surface of a conveyor made up of longitudinal members called slats. The slats are edge to edge with small gaps between the edges. The slats are supported on longitudinal bearing strips, one edge of each slat on one strip, the other on an adjacent strip. The bearing strips are supported on longitudinal beams, evenly spaced and running lengthwise of the cargo space of the conveyance in which the conveyor is mounted. The longitudinal beams are supported by, and fastened individually to, crossbeams of the conveyance. The bearing strips slide longitudinally onto the longitudinal beams and the slats slide longitudinally onto the bearing strips. Clearance is provided for fastening the longitudinal beams from above. The upper surfaces of the bearing strips have longitudinal grooves in the center of their upper surfaces. Flanged ribs on their lower surfaces engage the flanges of the longitudinal beams to hold the strips in place. The edges of the slats are over the grooves. Flanged ribs on the bottom surfaces of the slats engage the flanges on the longitudinal beams or, in some configurations, the edges of the bearing strips. The conveyor includes hydraulic/mechanical apparatus well known in the art for reciprocating the slats in prescribed ways to move loads along the conveyor.

In U.S. Pat. No. 6,513,648, Halstrom et al. disclose a container of a mobile cargo trailer with a reciprocating slat type conveyor floor. The elongated slats are supported at their lateral edges on V-shaped bearings, which are mounted on Y-shaped supports integral with sub-deck sections on the container bottom and joined together with watertight seals. Three cross beams are connected to different groups of the slats and are coupled to hydraulic cylinders located outwardly of the front end of the container and in horizontal alignment with the slats. The cylinders are coupled to a hydraulic fluid pressure source through an arrangement of control valves to effect movement of the group of slats simultaneously in a load moving direction and, sequentially, in the opposite, slat-retracting direction, with interengaging abutments on the cross drives arranged for moving one of the cross drives and its slats by hydraulic power, applied only to the other two cross drive cylinders.

Wilkens et al., in U.S. Pat. No. 7,152,729, describe a reciprocating floor conveyor that includes floor slats and slide bearings. The floor slats include a top section, first and second side walls that extend downward from the top section, a first bottom flange integral with the first side wall and a second bottom flange integral with a second side wall. A top section cantilever portion extends laterally outward from the second side wall. A seal flange is integral with the first side wall and includes a seal support surface and a seal flange wall that cooperate with the first side wall to form a seal retainer channel position below the cantilever portion of an adjacent floor slat. The slide bearings have a cross beam, and right and left walls. Wings extend laterally outward from the top of the walls and sit on guide beams.

In U.S. Pat. No. 7,604,109, Foster et al. disclose a trailer and a dock with substantially identical slat conveyors. Each conveyor has alternating conveyor slats and lifting/holding slats. The trailer is backed up to the dock. Upper portions of the lifting/holding slats are coupled together at their ends. The confronting ends of the conveying slats are also coupled together. A mechanism, carried by the dock, raises and lowers the upper portions of the two sets of lifting/holding slats, and a drive mechanism, carried by the dock, reciprocates both sets of conveying slats.

Applicant has devised a rail conveyor system that overcomes many of the short comings of presently known transport system.

SUMMARY OF THE INVENTION

The invention is a rail conveyor system, adapted for mounting upon the floor of a container for conveying a load therein. The rail conveyor system comprises a base member for supporting a rail conveyor mechanism. The rail conveyor mechanism includes a mechanical power transfer assembly mounted within the base member. A plurality of support rod members is mounted in parallel upon the base member and is rotatable by the mechanical power transfer assembly. A plurality of square tube members is mounted mutually parallel and rests perpendicular to and upon the support rod members to provide a uniform support surface above the base member. The tube members are operatively connected to the power transfer assembly for sequential, longitudinal reciprocation, which occurs perpendicular to the support rod members. The support rod members each include a series of indented surfaces for sequentially lowering one of the tube members relative to adjacent, bracketing tube members. The mechanical power transfer assembly provides sequential, longitudinal movement of the adjacent, bracketing tube members in one direction and movement of the bracketed tube member in an opposite direction, while simultaneously rotating the support rod members to first lower the opposite moving bracketed tube member during said movement, and then raise the bracketed tube member. The rail conveyor system is designed for moving heavy loads and can be operated to move the load parallel to the tube members in either direction.

An important advantage of the present invention is that the load resting upon the rail conveyor bed is never lifted by the tube members. The reciprocating tube members move in a first direction to carry the load in that direction, then each tube member sequentially lowers, moves in a second direction opposite the first direction, then rises and again moves in the first direction to transfer the load. A number of different mechanical linkages can be employed to sequentially operate the square tube members.

In one embodiment of the invention, the mechanical linkage between power transfer assembly and the elongated square tubes includes a cylindrical cam member, driven by a main power shaft. The cylindrical cam member is mounted to the base member for axial rotation and includes a plurality groove tracks, extending eccentrically about the circumference of the cam member. A like plurality of follower plate members are slidably mounted to the base member, with each follower plate member having a follower pin extending into one of the groove tracks of the cylindrical cam member. Each follower plate member is pivotally connected to a lever assembly for imparting sequential, longitudinal, reciprocation to a portion of the plurality of square tube members, resting upon the support rod members upon rotation of the cylindrical cam member.

DESCRIPTION OF THE EMBODIMENTS

Nomenclature

Figure 1:
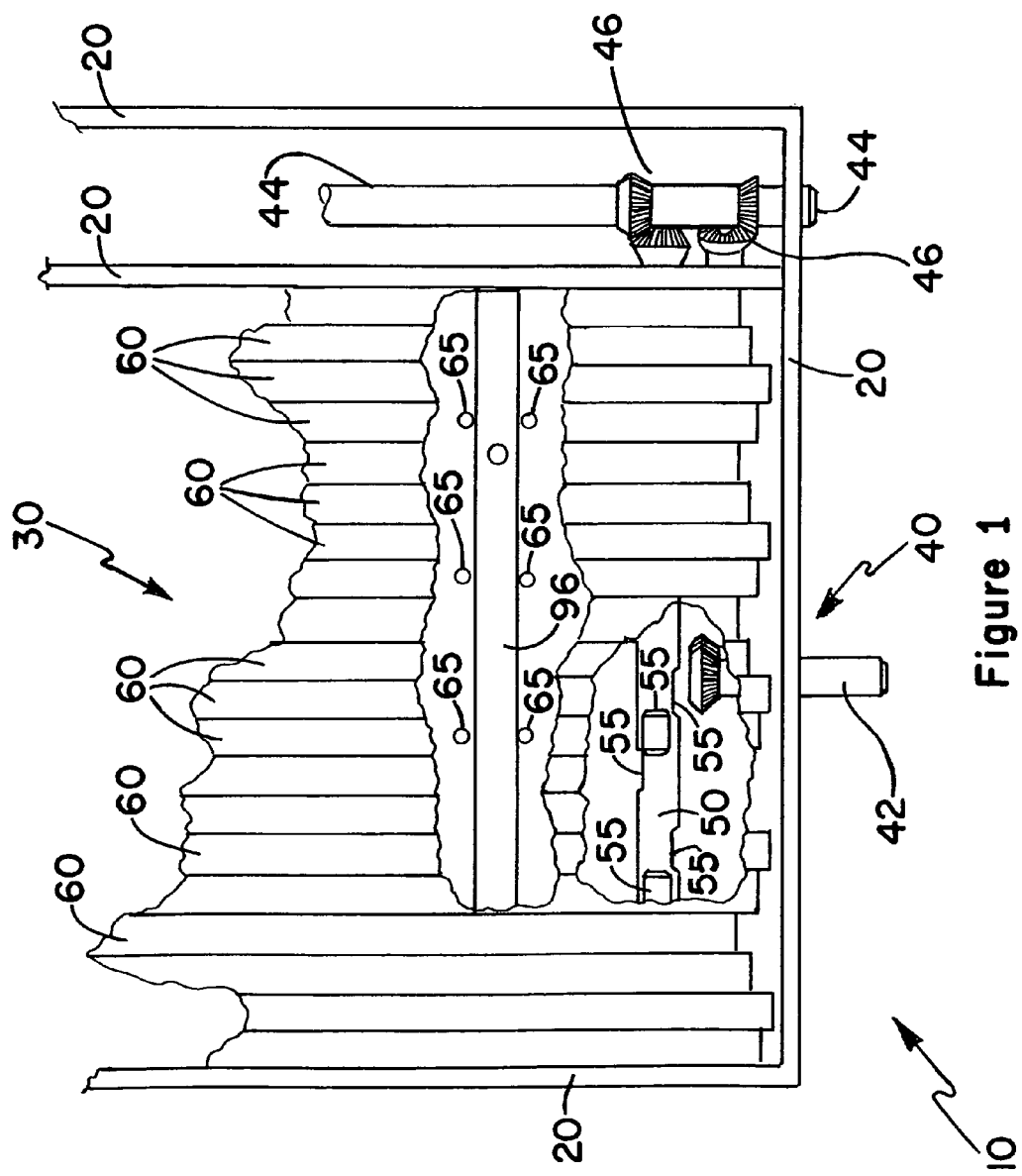
FIG. 1 is a top view of a portion of the rail conveyor system of the present invention.
Figure 2:
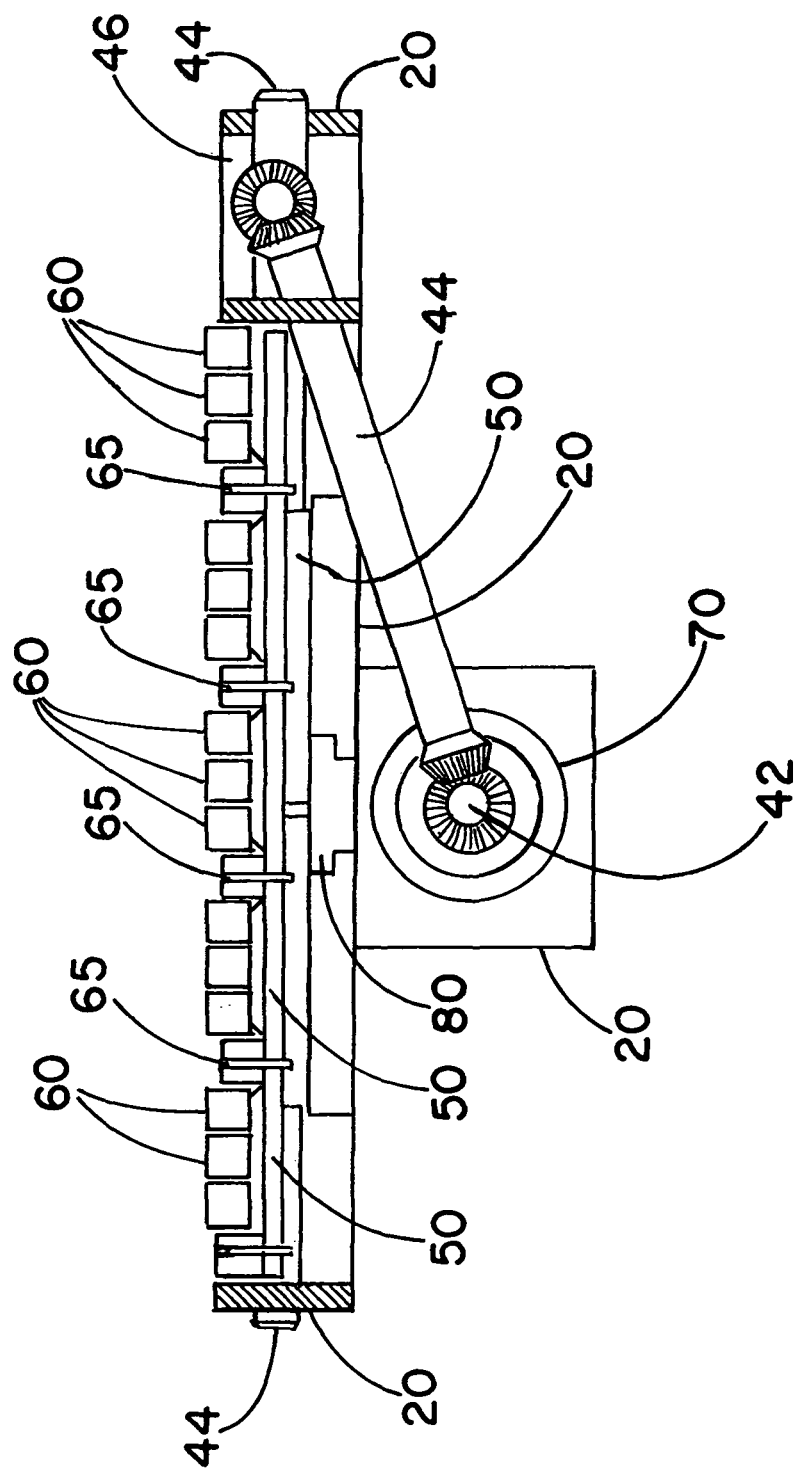
FIG. 2 is an end view of the mechanical power transfer assembly and square tube members of the rail conveyor system of the present invention.
Figure 3:
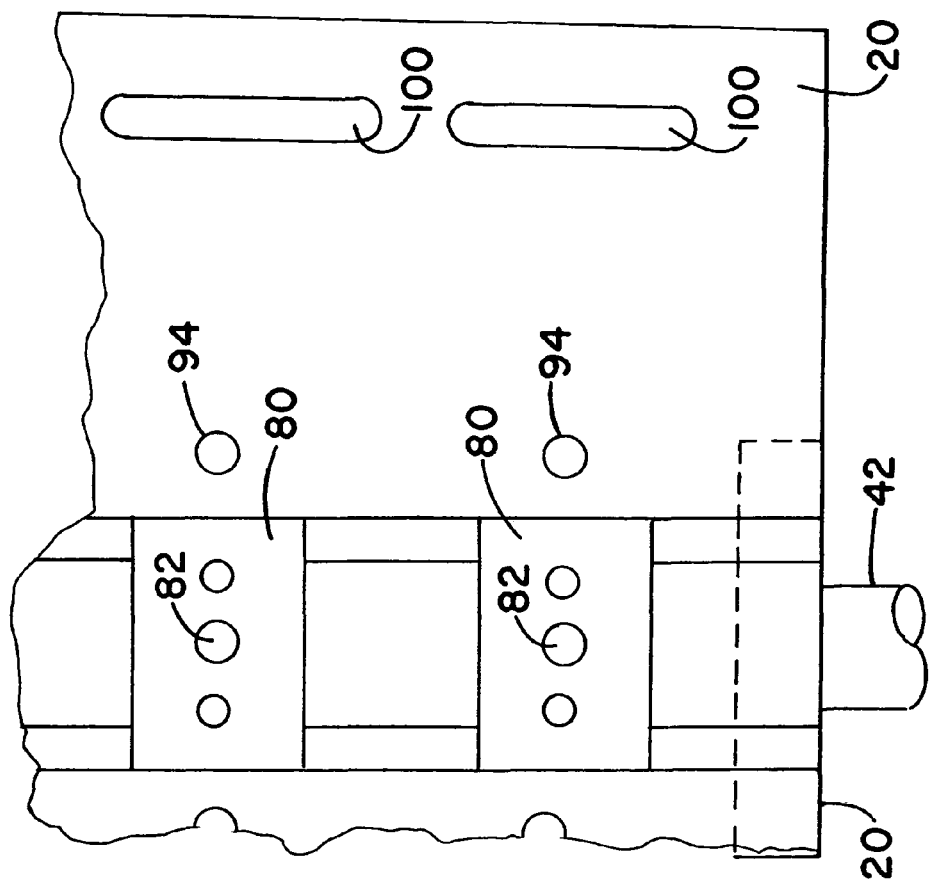
FIG. 3 is a top view of a portion of the follower plate members and base member of the rail conveyor system of the present invention.
Figure 4:
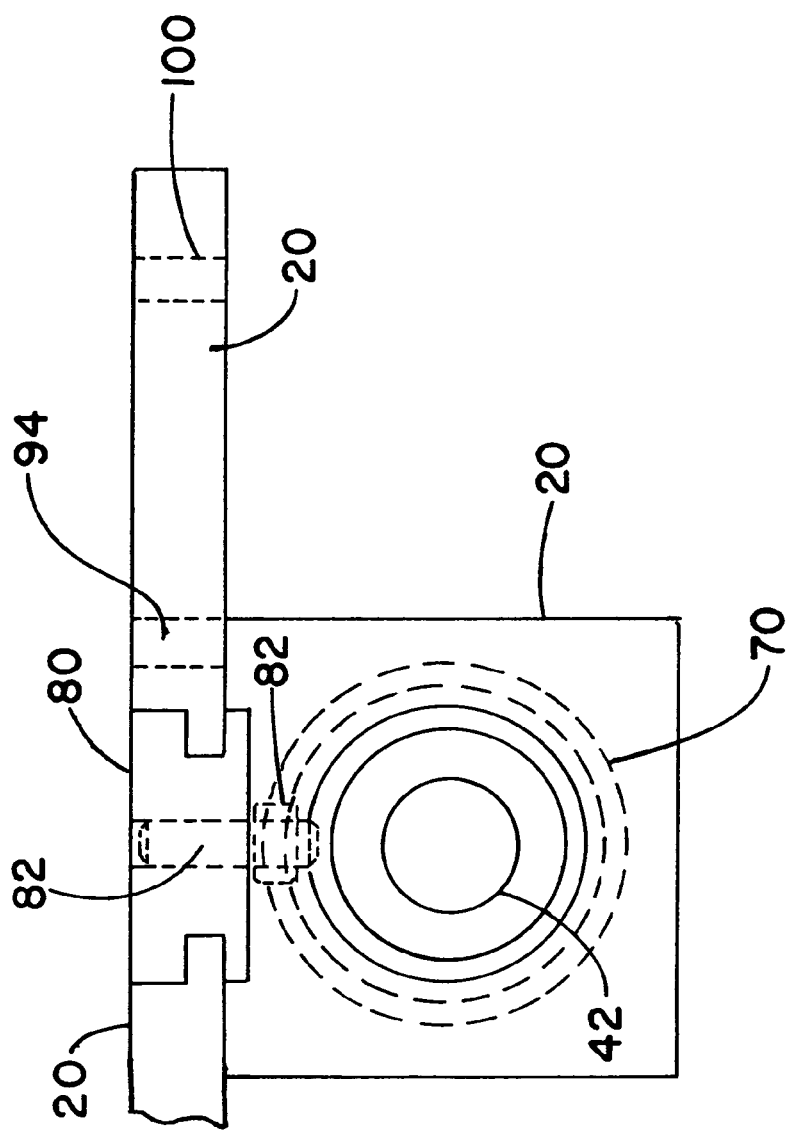
FIG. 4 is an end view of the follower plate members and base member of the rail conveyor system of the present invention.

| | |
|---|---|
| 10 | Rail Conveyor System |
| 20 | Base Member |
| 30 | Rail Conveyor Mechanism |
| 40 | Mechanical Power Transfer Assembly |
| 42 | Main Power Shaft |
| 44 | Drive Shafts |
| 46 | Geared Connections |
| 50 | Support Rod Members |
| 55 | Indented Surfaces of Rod Members |
| 60 | Square Tube Members |
| 65 | Tube Member Pegs |
| 70 | Cylindrical Cam Member |
| 72 | Grooved Track of Cam Member |
| 74 | Grooved Track of Cam Member |
| 76 | Grooved Track of Cam Member |
| 78 | Grooved Track of Cam Member |
| 80 | Follower Plate Members |
| 82 | Follower Pins |
| 90 | Lever Assemblies |
| 92 | Pivoting Levers |
| 94 | Pivot Pins of Pivoting Lever |
| 96 | Sliding Levers |
| 98 | Connector Pins of Sliding Levers |
| 100 | Guide Slots for Connector Pins |

Construction

The invention is a conveyor or walking floor system, adapted for installation and operation within cargo transport vehicles, as well as other applications where selective directional movement of items is required. The rail conveyor system comprises a base member for supporting a rail conveyor mechanism. The rail conveyor mechanism includes a mechanical power transfer assembly mounted within the base member. A plurality of support rod members is mounted in parallel upon the base member and is rotatable by the mechanical power transfer assembly. A plurality of square tube members is mounted mutually parallel and rests perpendicular to and upon the support rod members to provide a uniform support surface above the base member. The tube members are operatively connected to the power transfer assembly for sequential, longitudinal reciprocation, which occurs perpendicular to the support rod members. The support rod members each include a series of indented surfaces for sequentially lowering one of the tube members relative to adjacent, bracketing tube members. The mechanical power transfer assembly provides sequential, longitudinal movement of the adjacent, bracketing tube members in one direction and movement of the bracketed tube member in an opposite direction, while simultaneously rotating the support rod members to first lower the opposite moving bracketed tube member during said movement, and then raise the bracketed tube member. The rail conveyor system is designed for moving heavy loads and can be operated to move the load parallel to the tube members in either direction. A number of different mechanical linkages can be employed to sequentially operate the square tube members.

Referring now to FIGS. 1-10, a first embodiment of the rail conveyor system 10, adapted for mounting upon the floor of a container for conveying a load therein, is illustrated. The rail conveyor system 10 is suitable for mounting upon the bed of a truck or trailer, such as those used for over-the-road transporting of goods. Additionally, the rail conveyor system 10 functions equally well when positioned upon the floor of a containerized cargo unit of the type used for trans-oceanic shipping of goods. Many other applications of the rail conveyor system 10 of the present invention are envisioned.

The rail conveyor system 10 comprises a base member 20 for supporting a rail conveyor mechanism 30. The rail conveyor mechanism 30 includes a mechanical power transfer assembly 40, mounted within the base member 20. A plurality of support rod members 50 are mounted in parallel upon the base member 20 and are rotatable by the mechanical power transfer assembly 40. A plurality of square tube members 60 are mounted mutually parallel and rest perpendicular to and upon the support rod members 50 to provide a uniform support surface above the base member 20.

Figure 7:
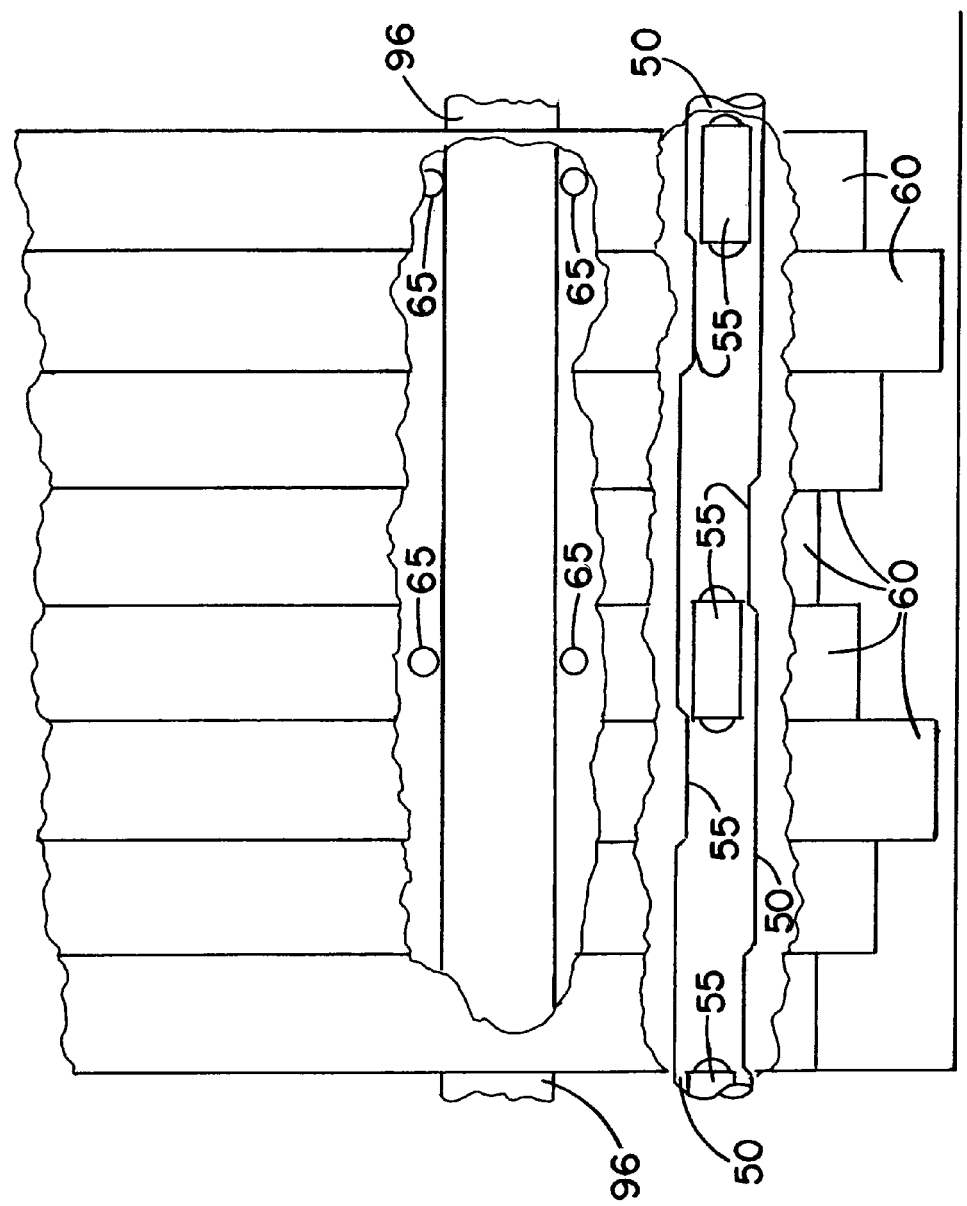
FIG. 7 is a cut away view of the lever assemblies, support rod members and square tube members of the rail conveyor system of the present invention.
Figure 8:
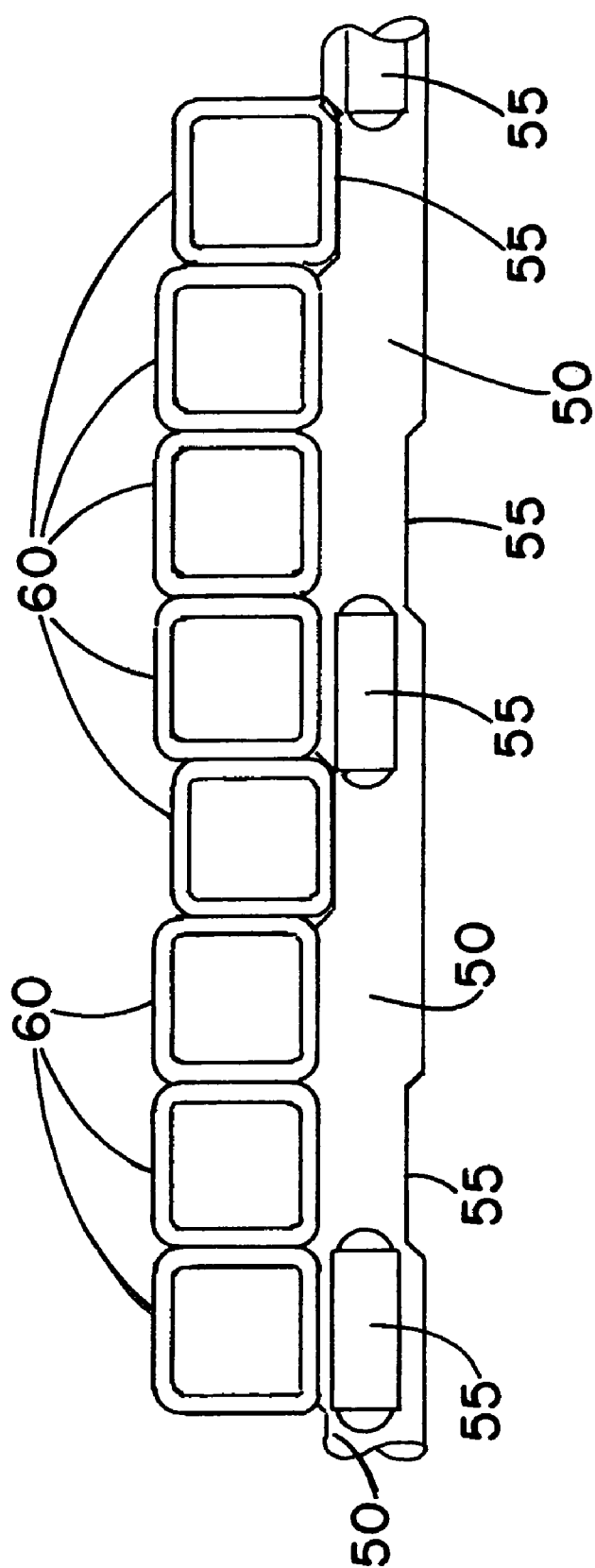
FIG. 8 is a cross sectional view of a support rod member and the square tube members of the rail conveyor system of the present invention.
Figure 9:
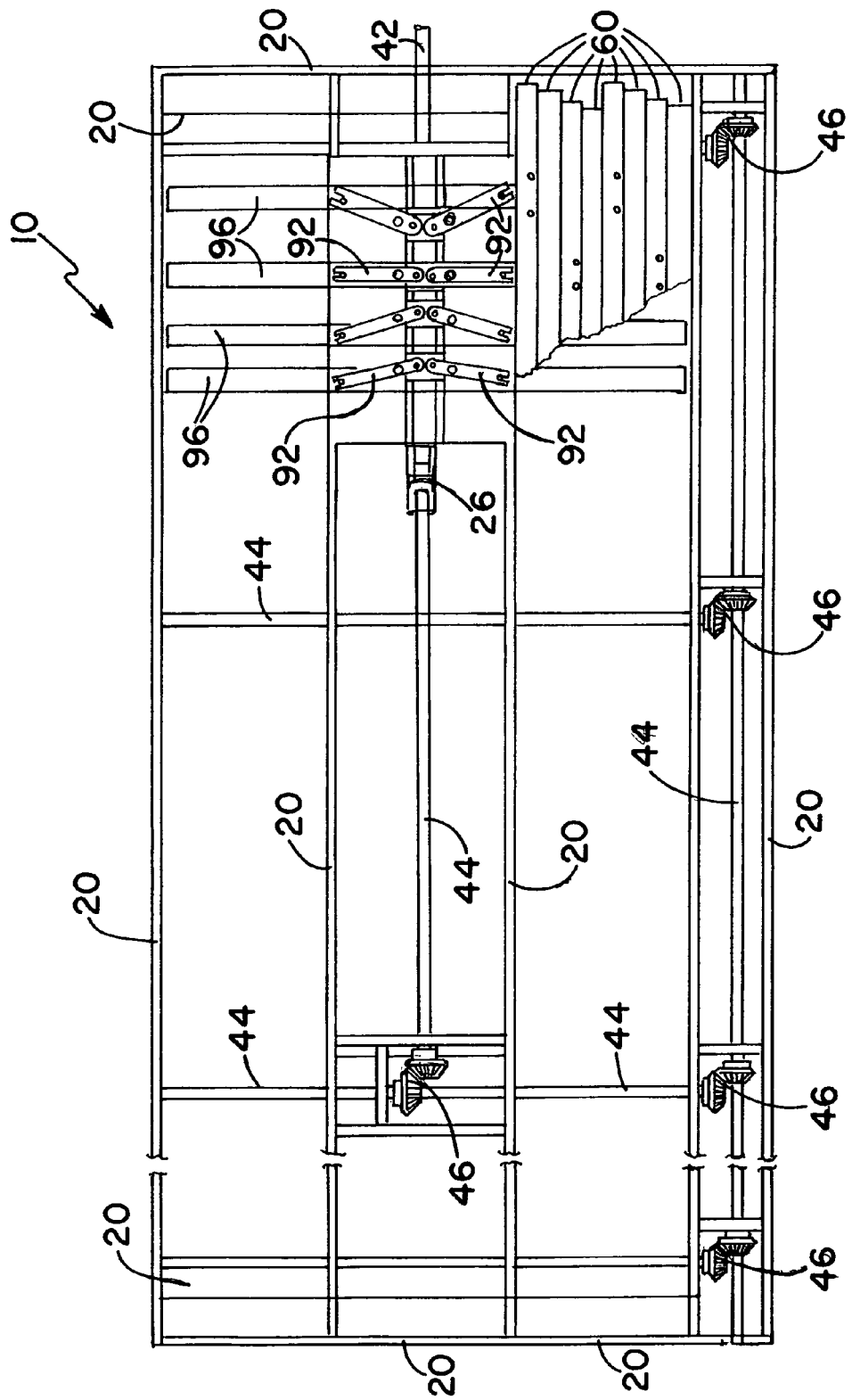
FIG. 9 is a top view of the base member and mechanical power transfer assembly, and a portion of the square tube members of the rail conveyor system of the present invention.
Figure 10:
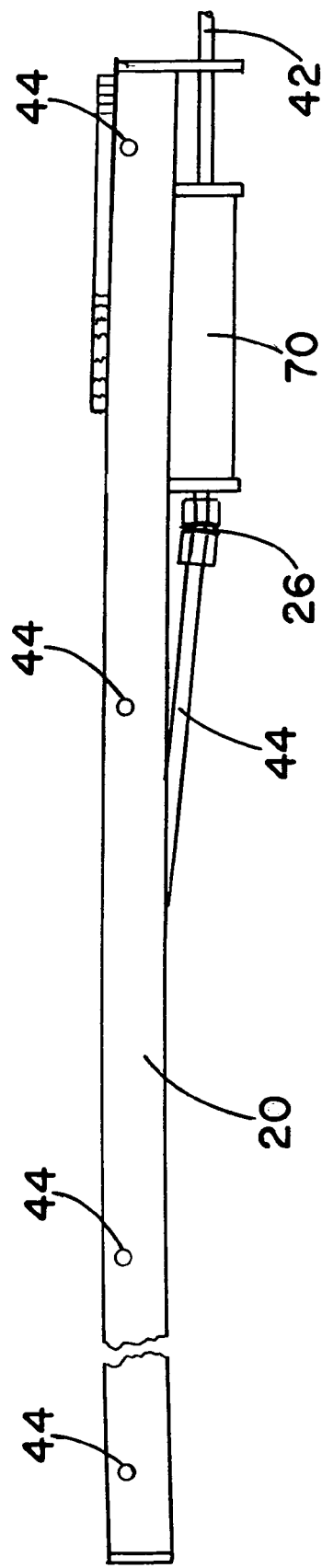
FIG. 10 is a side view of the base member and mechanical power transfer assembly, and a portion of the square tube members of FIG. 10 of the rail conveyor system of the present invention.

The tube members 60 are operatively connected to the power transfer assembly 40 for sequential, longitudinal reciprocation, which occurs perpendicular to the support rod members 50. The support rod members 50 each include a series of indented surfaces 55 for sequentially lowering one of the tube members 60 relative to the adjacent, bracketing tube members 60. In the embodiment illustrated in FIGS. 1, 2, 7 and 8, the indented surfaces 55 are offset from each other and positioned at 90 degree intervals along the length of each support rod member 50. Thus, each lowered tube member 60 is bracketed by three adjacent tube members 60 on either side of the lowered tube member 60. The interaction of the indented surfaces 55 with the tube members 60, is best illustrated in FIGS. 7 and 8.

The mechanical power transfer assembly 40 provides sequential, longitudinal movement of the adjacent, bracketing tube members 60 in one direction and movement of the bracketed tube member 60 in an opposite direction. Simultaneously, rotation of the support rod members 50 first lowers the opposite moving, bracketed tube member 60, during said movement, and then raises the bracketed tube member 60. The rail conveyor system 10 is designed for moving heavy loads and can be operated to move the load parallel to the tube members 60 in either direction. A number of different mechanical linkages can be employed to sequentially operate the square tube members 60.

Figure 11:
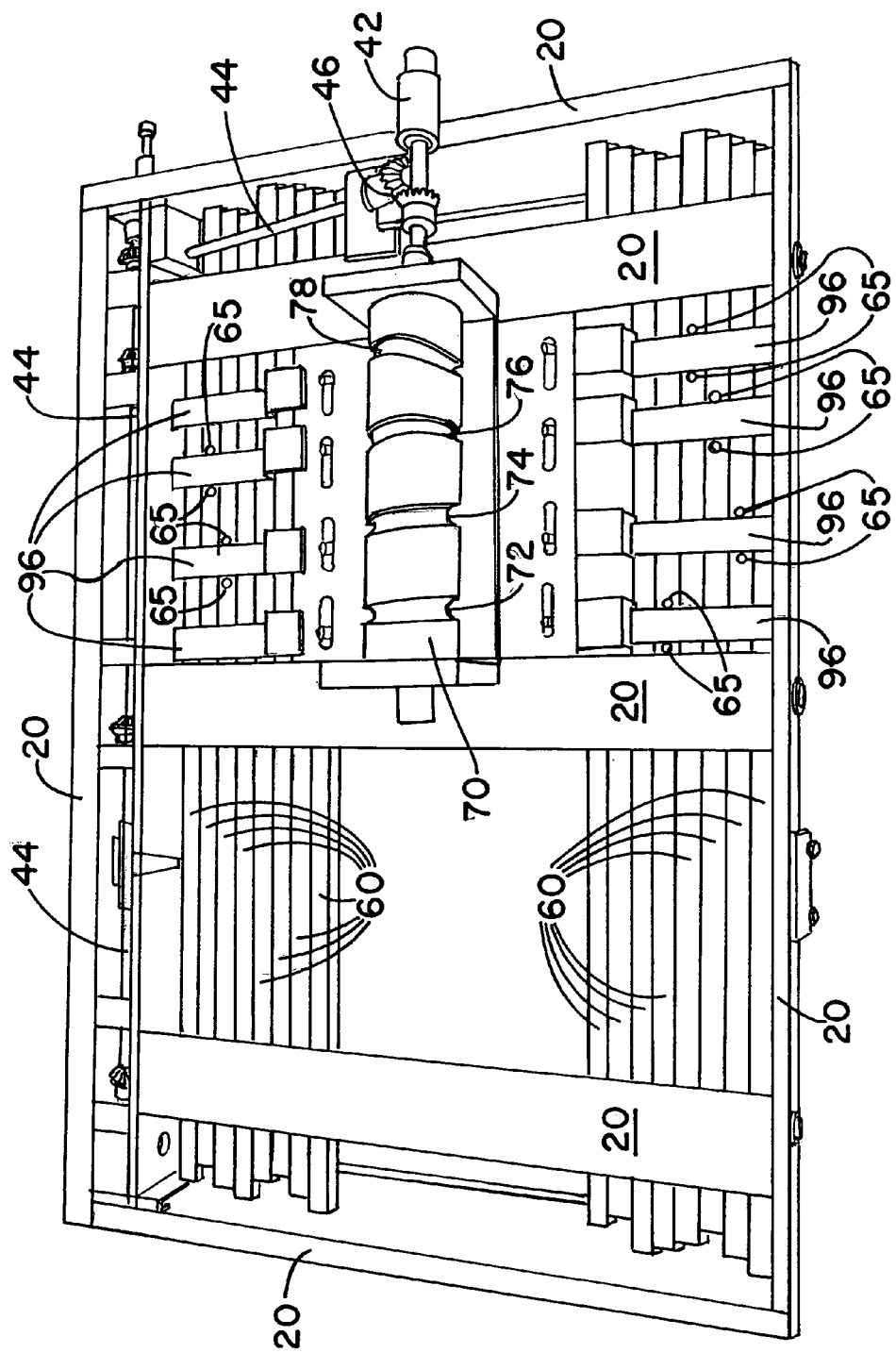
FIG. 11 is a bottom view of the rail conveyor system of the present invention with a portion of the square tube members removed.

In one embodiment of the invention, the mechanical linkage between the power transfer assembly 40 and the elongated square tubes 60 includes a cylindrical cam member 70, directly driven by a main power shaft 42. The cylindrical cam member 70 is mounted to the base member 20 for axial rotation and includes four grooved tracks 72, 74, 76, 78, extending eccentrically about the circumference of the cylindrical cam member 70, as shown in FIG. 11. Four follower plate members 80 are slidably mounted to the base member 20, with each follower plate member 80 having a follower pin 82 extending into one of the four grooved tracks 72, 74, 76, 78, of the cylindrical cam member 70. Each follower plate member 80 is pivotally connected to a lever assembly 90 for imparting sequential, longitudinal, reciprocation, in this embodiment, to one-fourth of the plurality of square tube member 60 resting upon the support rod members 50 upon rotation of the cylindrical cam member 70. Alternatively, the cylindrical cam member 70 may include three or five grooved tracks interfaced with a corresponding number of follower plate members 80, each having a follower pin 82 extending into one of the grooved tracks, and connected to a lever assembly 90.

Figure 5:
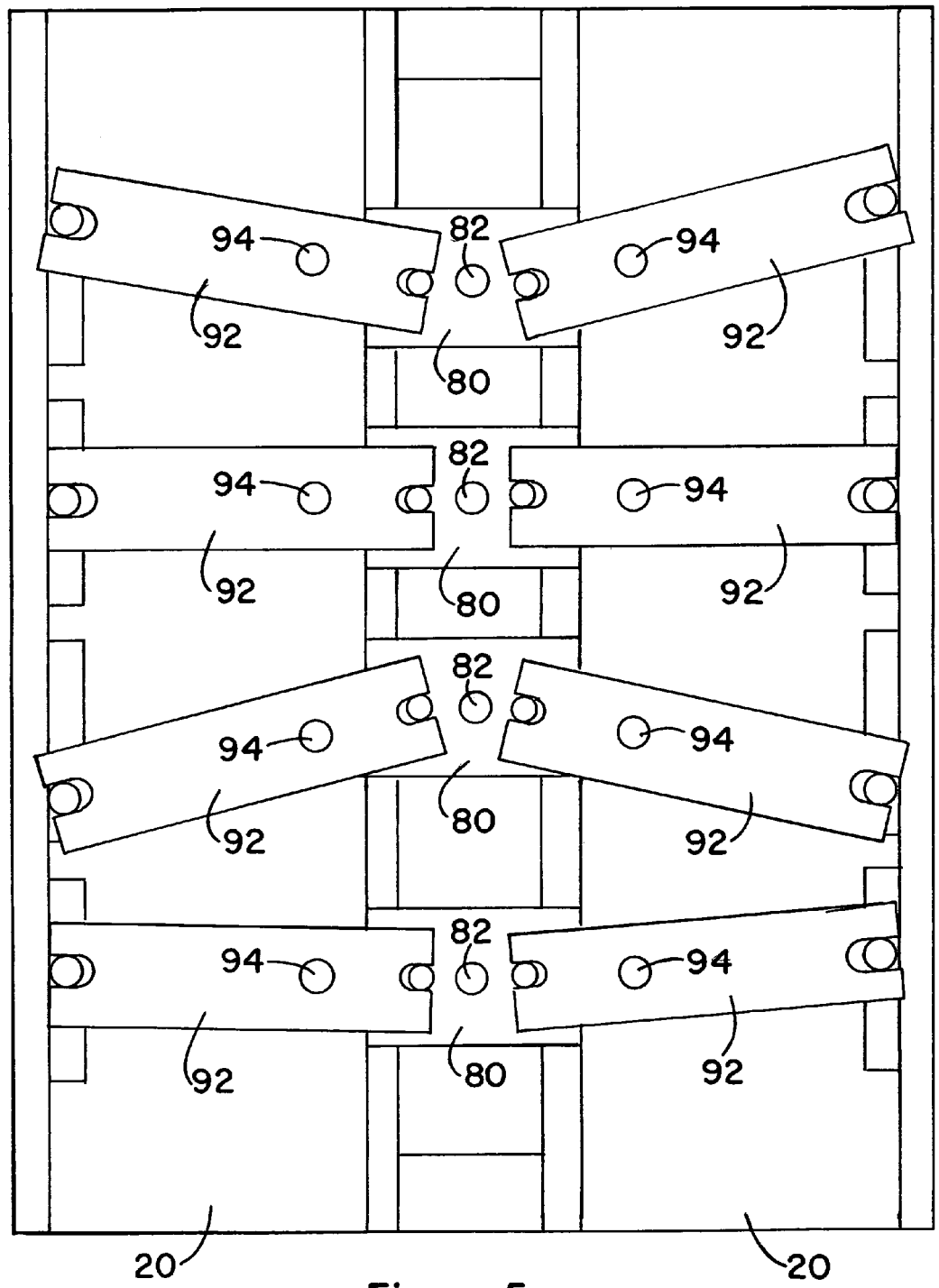
FIG. 5 is a top view of the follower plate members and the lever assemblies of the rail conveyor system of the present invention.
Figure 6:
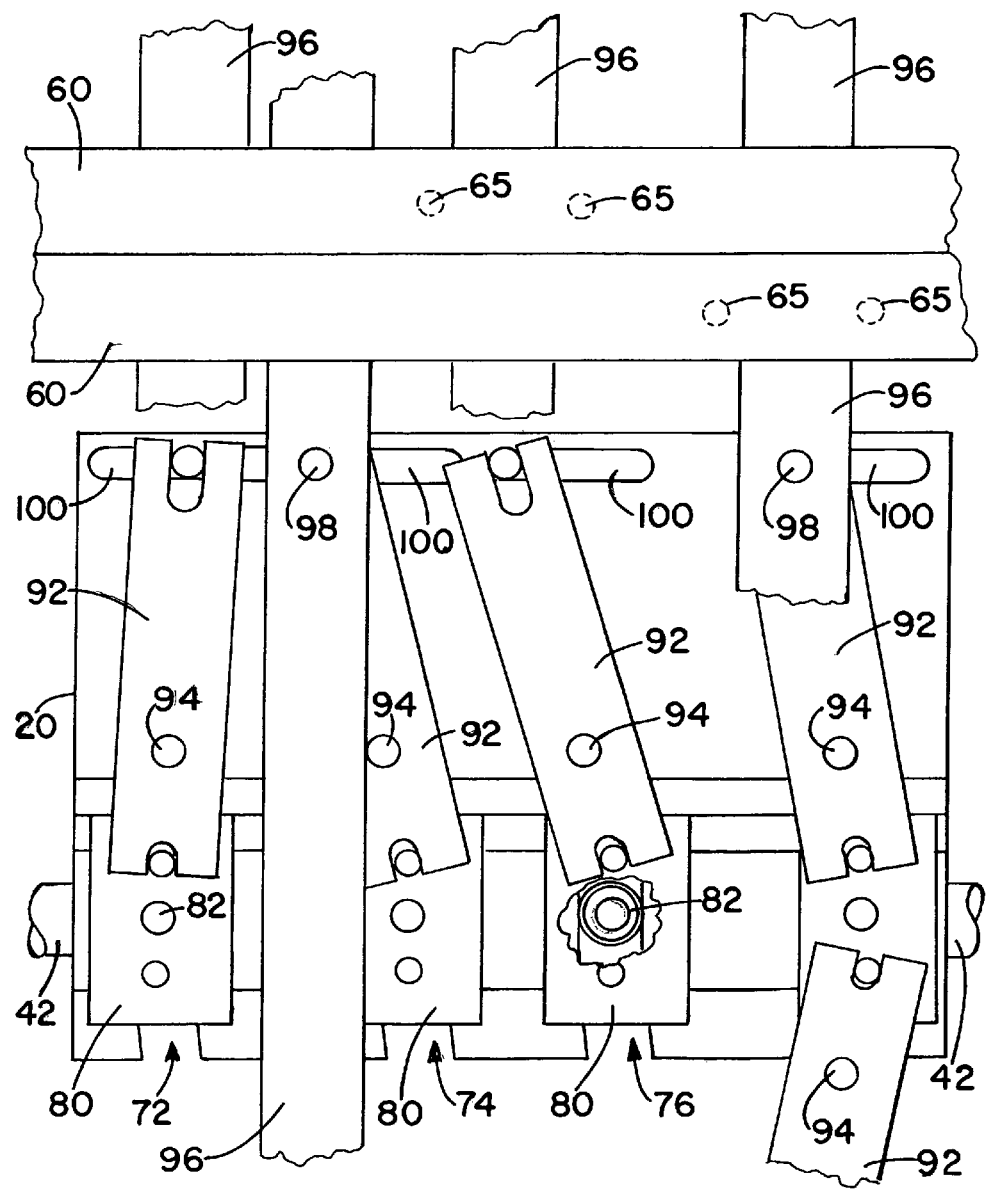
FIG. 6 is another top view of the follower plate members and the lever assemblies of the rail conveyor system of the present invention.

As illustrated in FIGS. 5 and 6, the follower plate members 80 are pivotally connected to pivoting levers 92, each of which pivots on a pivot pin 94. The end of each pivoting lever 92 opposite the follower plate member 80 drives a connector pin 98 secured to a sliding lever 96, best seen in FIG. 6. The connector pin 98 rides in a guide slot 100 in the stationary base member 20 and transfers reciprocating movement to the sliding lever 96 in response to rotation of the cylindrical cam member 70.

In the current embodiment of the invention, every fourth square tube member 60 is reciprocally driven by one set of sliding levers 96 through interaction with pairs of tube member pegs 65, extending downwardly from the tube member 60, with one peg 65 positioned on each side of the sliding lever 96. There is sufficient space between the bottom of the tube members 60 and the associated sliding levers 96, so that the tube members 60 can move vertically as the support rod members 50 rotate and the tube members 60 are lowered and raised upon encountering the indented surface 55 of the support rod members 50 contacting the bottom side of the tube members 60. Because the sliding levers 96 must provide reciprocating (forward and backward) motion to the tube members 60, backward movement of the sliding levers 96 is synchronized with first lowering and then raising the bracketed tube member 60 by the indentations 55 in the support rod members 50. Thus, the mechanical power transfer assembly 40, described in detail above, provides sequential, longitudinal movement of three adjacent, bracketing tube members 60 in one direction and movement of a fourth bracketed tube member 60 in an opposite direction, while simultaneously rotating the support rod members 50 to first lower the opposite moving bracketed tube member 60 during said movement, and then raising the bracketed tube member 60. The opposite direction movement with concurrent lowering and raising of a tube member 60 then occurs to the next tube member 60 and continues across the full width of the support surface formed by all of the tube members 60.

An important advantage of the present invention is that the load resting upon the rail conveyor bed is never lifted by the tube members 60. The reciprocating tube members 60 move in a first direction to carry the load in that direction, then each tube member 60 sequentially lowers, moves in a second direction opposite the first direction, then rises and again moves in the first direction to transfer the load.

The rail conveyor system 10 of the present invention is designed so that rotation of the main power shaft 42 in one direction causes the rail conveyor mechanism 30 to transfer a load in one direction, for example, into a cargo transport vehicle. Rotation of the main power shaft 42 in the opposite direction causes the rail conveyor mechanism 30 to transfer a load in the opposite direction, for example, out of a cargo transport vehicle.

The main power shaft 42 drives the rail conveyor system 10 by rotation of the shaft 42. The shaft 42 can be connected to the cargo transport vehicle engine via a suitable connection. Alternatively, the shaft 42 can be rotated by a non-dedicated power source, such as an internal combustion engine, an electric motor or hydraulic motor.

While the invention has been particularly shown and described with reference to preferred embodiments thereof, it will be understood by those skilled in the art that various changes in form and details may be made therein without departing from the spirit and scope of the invention.

I claim:

1. A rail conveyor system adapted for mounting upon the floor of a container for conveying a load therein, the rail conveyor system comprising:
    a base member for supporting a rail conveyor mechanism, the rail conveyor mechanism including;
    a mechanical power transfer assembly mounted within the base member;
    a plurality of support rod members mounted in parallel upon the base member and rotatable by the mechanical power transfer assembly;
    a plurality of square tube members mounted mutually parallel and resting perpendicular to and upon the support rod members to provide a uniform support surface above the base member;
    the tube members operatively connected to the power transfer assembly for sequential, longitudinal, reciprocation perpendicular to the support rod members;
    the support rod members each including a series of indented surfaces for sequentially lowering one of the tube members relative to adjacent, bracketing tube members; and
    the mechanical power transfer assembly providing sequential, longitudinal movement of the adjacent, bracketing tube members in one direction and movement of a bracketed tube member in an opposite direction, while simultaneously rotating the support rod members to first lower the opposite moving bracketed tube member during said movement, and then to raise the bracketed tube member.

2. The rail conveyor system adapted for mounting upon the floor of a container for conveying a load therein of claim 1, wherein the mechanical power transfer assembly includes a main power shaft driving a plurality of drive shafts supported within the base member, the drive shafts operatively connected to each of the plurality of support rod member for rotation thereof.

3. The rail conveyor system adapted for mounting upon the floor of a container for conveying a load therein of claim 2, wherein the mechanical power transfer assembly includes a cylindrical cam member driven by the main power shaft, the cylindrical cam member mounted to the base member for axial rotation, the cylindrical cam member operatively connected to each of the plurality of square tube members for imparting sequential, longitudinal, reciprocation thereto.

4. The rail conveyor system adapted for mounting upon the floor of a container for conveying a load therein of claim 3, wherein the cylindrical cam member includes a plurality of groove tracks extending eccentrically about the circumference of the cam member, with a like plurality of follower plate members slidably mounted to the base member, each follower plate member having a follower pin extending into one of the plurality of groove tracks of the cylindrical cam member, each follower plate member pivotally connected to a lever assembly for imparting sequential, longitudinal, reciprocation to a portion of the plurality of square tube member resting upon the support rod members upon rotation of the cylindrical cam member.

5. A rail conveyor system adapted for mounting upon the floor of a container for conveying a load therein, the rail conveyor system comprising:
    a base member for supporting a rail conveyor mechanism, the rail conveyor mechanism including;
    a mechanical power transfer assembly mounted within the base member including a main power shaft driving a plurality of drive shafts supported within the base member, the drive shafts operatively connected to each of a plurality of support rod members mounted in parallel upon the base member with each support rod member rotatable by the mechanical power transfer assembly;
    a plurality of square tube members mounted mutually parallel and resting perpendicular to and upon the support rod members to provide a uniform support surface above the base member;
    the tube members operatively connected to the power transfer assembly for sequential, longitudinal, reciprocation perpendicular to the support rod members;
    the support rod members each including a series of indented surfaces for sequentially lowering one of the tube members relative to adjacent, bracketing tube members; and
    the mechanical power transfer assembly providing sequential, longitudinal movement of the adjacent, bracketing tube members in one direction and movement of a bracketed tube member in an opposite direction, while simultaneously rotating the support rod members to first lower the opposite moving bracketed tube member during said movement, and then to raise the bracketed tube member.

6. The rail conveyor system adapted for mounting upon the floor of a container for conveying a load therein of claim 5, wherein the mechanical power transfer assembly includes a cylindrical cam member driven by the main power shaft, the cylindrical cam member mounted to the base member for axial rotation, the cylindrical cam member operatively connected to each of the plurality of square tube members for imparting sequential, longitudinal, reciprocation thereto.

7. The rail conveyor system adapted for mounting upon the floor of a container for conveying a load therein of claim 6, wherein the cylindrical cam member includes a plurality of groove tracks extending eccentrically about the circumference of the cam member, with a like plurality of follower plate members slidably mounted to the base member, each follower plate member having a follower pin extending into one of the plurality of groove tracks of the cylindrical cam member, each follower plate member pivotally connected to a lever assembly for imparting sequential, longitudinal, reciprocation to a portion of the plurality of square tube member resting upon the support rod members upon rotation of the cylindrical cam member.

8. The rail conveyor system adapted for mounting upon the floor of a container for conveying a load therein of claim 7, wherein the cylindrical cam member includes four groove tracks extending eccentrically about the circumference of the cam member, with four follower plate members slidably mounted to the base member, each having a follower pin extending into one of the four grooved tracks of the cylindrical cam member, each follower plate member pivotally connected to a lever assembly for imparting sequential, longitudinal, reciprocation to one-fourth of the plurality of square tube member resting upon the support rod members upon rotation of the cylindrical cam member.

9. A rail conveyor system adapted for mounting upon the floor of a container for conveying a load therein, the rail conveyor system comprising:
    a base member for supporting a rail conveyor mechanism, the rail conveyor mechanism including;
    a mechanical power transfer assembly mounted within the base member;

a plurality of support rod members mounted in parallel upon the base member and rotatable by the mechanical power transfer assembly;

a plurality of square tube members mounted mutually parallel and resting perpendicular to and upon the support rod members to provide a uniform support surface above the base member;

the tube members operatively connected to the power transfer assembly for sequential, longitudinal, reciprocation perpendicular to the support rod members;

the support rod members each including a series of indented surfaces for sequentially lowering one of the tube members relative to three adjacent, bracketing tube members; and the mechanical power transfer assembly providing sequential, longitudinal movement of three adjacent, bracketing tube members in one direction and movement of a bracketed tube member in an opposite direction, while simultaneously rotating the support rod members to first lower the opposite moving bracketed tube member during said movement, and then to raise the bracketed tube member.

10. The rail conveyor system adapted for mounting upon the floor of a container for conveying a load therein of claim 9, wherein the mechanical power transfer assembly includes a main power shaft driving a plurality of drive shafts supported within the base member, the drive shafts operatively connected to each of the plurality of support rod member for rotation thereof.

11. The rail conveyor system adapted for mounting upon the floor of a container for conveying a load therein of claim 10, wherein the mechanical power transfer assembly includes a cylindrical cam member directly driven by the main power shaft, the cylindrical cam member mounted to the base member for axial rotation, the cylindrical cam member operatively connected to each of the plurality of square tube members for imparting sequential, longitudinal, reciprocation thereto.

12. The rail conveyor system adapted for mounting upon the floor of a container for conveying a load therein of claim 11, wherein the cylindrical cam member includes four groove tracks extending eccentrically about the circumference of the cam member, with four follower plate members slidably mounted to the base member, each follower plate member having a follower pin extending into one of the four grooved tracks of the cylindrical cam member, each follower plate member pivotally connected to a lever assembly for imparting sequential, longitudinal, reciprocation to one-fourth of the plurality of square tube member resting upon the support rod members upon rotation of the cylindrical cam member.

\* \* \* \* \*